(12) United States Patent
Gong et al.

(10) Patent No.: US 10,799,895 B2
(45) Date of Patent: Oct. 13, 2020

(54) SWITCH VALVE SPOOL AND A SHOWER (71) Applicant: XIAMEN SOLEX HIGH-TECH INDUSTRIES CO., LTD., Xiamen, Fujian (CN)

(72) Inventors: Hailang Gong, Fujian (CN); Mingfu Zhang, Fujian (CN); Fengde Lin, Fujian (CN); Wenxing Chen, Fujian (CN)

(73) Assignee: XIAMEN SOLEX HIGH-TECH INDUSTRIES CO., LTD., Xiamen (CN)

( * ) Notice: Subject to any disclaimer, the term of this patent is extended or adjusted under 35 U.S.C. 154(b) by 156 days.

(21) Appl. No.: 15/964,715

(22) Filed: Apr. 27, 2018

(65) Prior Publication Data

US 2018/0318859 A1    Nov. 8, 2018

(30) Foreign Application Priority Data

May 4, 2017    (CN) .......................... 2017 1 0308529

(51) Int. Cl.
| | |
|---|---|
| *B05B 7/04* | (2006.01) |
| *F16K 11/00* | (2006.01) |
| *B05B 12/00* | (2018.01) |
| *B05B 1/30* | (2006.01) |
| *B05B 1/16* | (2006.01) |
| *B05B 1/18* | (2006.01) |
| *F16K 11/07* | (2006.01) |
| *E03C 1/04* | (2006.01) |

(Continued)

(52) U.S. Cl.
CPC .......... *B05B 7/0425* (2013.01); *B05B 1/1663* (2013.01); *B05B 1/18* (2013.01); *B05B 1/185* (2013.01); *B05B 1/3026* (2013.01); *B05B 12/0026* (2018.08); *E03C 1/0409* (2013.01); *E03C 1/084* (2013.01); *F16K 11/0716* (2013.01); *F16K 19/006* (2013.01); *F16K 31/605* (2013.01)

(58) Field of Classification Search
CPC . B05B 7/0425; B05B 12/0026; B05B 1/1663; B05B 1/18; B05B 1/185; B05B 1/3026; B05B 7/12; B05B 7/1209; B05B 7/066; E03C 1/0409; E03C 1/084; F16K 11/0716; F16K 19/006; F16K 31/605
USPC ...................... 239/428.5, 438, 440, 441, 300
See application file for complete search history.

(56) References Cited

U.S. PATENT DOCUMENTS

| | | | | |
|---|---|---|---|---|
| 3,820,716 A | * | 6/1974 | Bauer ....................... | B05B 1/08 239/589.1 |
| 6,357,675 B1 | * | 3/2002 | Schorn .................. | B05B 7/0425 239/311 |
| 2010/0264237 A1 | * | 10/2010 | Engel .................... | B05B 1/1654 239/443 |

* cited by examiner

*Primary Examiner* — Tuongminh N Pham
(74) *Attorney, Agent, or Firm* — Cooper Legal Group, LLC (57) ABSTRACT

A switching valve spool has a fixed shaft and a switching shaft coaxially arranged within. The switching shaft is linked with an operating unit and moves between a first, second, and third position in the fixed shaft along the axis. The switching shaft has an inlet and an outlet. In the first position of the switching shaft, the inlet is closed; in the second position of the switching shaft, the inlet is open and an air intake is formed between the side wall of the switching shaft closing to the outlet and the fixed shaft, when the water flows into the fixed shaft from the outlet, the air sucked from the air intake mixes with the water in the fixed shaft, because the fixed shaft diameter is larger than the outlet diameter; in the third position of the switching shaft, the inlet remains open and the air intake is closed.

11 Claims, 5 Drawing Sheets

(51) Int. Cl.
*E03C 1/084* (2006.01)
*F16K 31/60* (2006.01)

SWITCH VALVE SPOOL AND A SHOWER

FIELD OF THE INVENTION

The present invention relates to a water outlet device, more particularly to a waterstop valve spool in a water outlet device.

BACKGROUND OF THE INVENTION

The valve spool in the shower usually has the function of switching between the water spray and waterstop, which is convenient for users to hold the shower as well as switching the water spray or turning on/off the water at the same time. However, with the increase of the shower function, the existing shower is no longer simply having some several different shapes of sprinkler water, but some functional water, such as aerated spray. The aerated spray, which is mixed with air, has more impact force due to that the air is contained in the water. However, different consumers have different requirements for the impact force, for example, the elderly and the children may need a water flow with less impact, while the young people need a water flow with stronger impact. However, the switching among the waterstop, common water and functional water has not been achieved by the existing shower valve spool.

SUMMARY OF THE INVENTION

The object of the present invention is to disclose a switching valve spool, which has two outflow setting for aerated spray and non-aerated spray.

In order to solve the technical problem mentioned above, the present invention discloses a switching valve spool, comprising: a fixed shaft and a switching shaft coaxially arranged in the fixed shaft; said switching shaft is linked with an operating unit to make it move between the first position, the second position, and the third position in said fixed shaft along the axis.

One end of said switching shaft is an inlet and the other end is an outlet, and an axial flow passage is formed along the axial direction; when said switching shaft is at the first position, the inlet is closed to form a state of waterstop; when the switching shaft is at the second position, said inlet is open and an air intake is formed between the side wall of the switching shaft closing to the outlet and the fixed shaft, when the water flows into the fixed shaft from the outlet, due to the diameter of the fixed shaft is larger than the diameter of the outlet, the air is sucked from the air intake under the Venturi effect into the fixed shaft and mixes with the water flow to form an aerated spray; when said switching shaft is at the third position, said inlet remains open and said air intake is closed to form a non-aerated spray.

In a preferred embodiment: a first sealing unit coaxially arranged with said switching shaft is also included and is arranged at the rear of said inlet along the axial direction, when said switching shaft is at the first position, the end face of said inlet abuts against said first sealing unit to close said inlet.

In a preferred embodiment: the side of said fixed shaft closing to said inlet connects with a inlet joint; a containing cavity is located at the side of said inlet joint closing to the inlet; said first sealing unit is arranged in said containing cavity; the water flows into said containing cavity from the inlet joint and could only go through said flow passage to said fixed shaft.

In a preferred embodiment: said first sealing unit is arranged against an elastic unit and a support unit respectively at the two side of said first sealing unit along the axis; when said fixed shaft is at the first position, said elastic unit produces holding power to the first sealing unit to make it maintain the condition of fitting into the end face of said inlet; when said switching shaft is at other positions, said elastic unit drives the first sealing unit to reset to the initial position where the first sealing unit abuts against the support unit.

In a preferred embodiment: said support unit has a hole arranged along the axis to let the inlet of said switching shaft pass through the hole to enter said containing cavity. The outer region of the support unit has a inlet vertical to axial direction to drive the water coming from the inlet joint to get into said containing cavity.

In a preferred embodiment: there is a proper gap between the side of said first sealing unit which is away from said inlet and the back end of said containing cavity; when said switching shaft is at the first position, the water flow comes from the inlet of the support unit into the containing cavity, so that said first sealing unit is subjected to the pressure of the flow along the front and the back of the axial direction, the pressure is equal in magnitude and opposite in direction and it forms a balance of the water pressure.

In a preferred embodiment: a second sealing unit is arranged on the side of the outer wall of the switching shaft closing to the inlet, seals the gap between the switching shaft and the hole, so that the water in said containing cavity could only pass through said flow passage into said fixed shaft.

In a preferred embodiment: a third sealing unit is arranged on the side of said switching shaft closing to said outlet; said fixed shaft has a first cavity and a second cavity, which are mutually connected along the axial direction, the diameter of said first cavity is less than said second cavity so as to form a step surface in the connection between the first cavity and the second cavity; the water flows into said first cavity from the outlet of the switching shaft;

During the movement of said switching shaft from the first position to the third position, said third sealing unit moves toward the direction of said step surface; when said switching shaft is at the second position, said third sealing unit does not contact with the step surface so that the gap between the outer wall of said switching shaft and the step surface forms said air intake; when said switching shaft is at the third position, said third sealing unit abuts against the step surface so that said air intake is closed.

The present invention also discloses a shower, comprising: a main body of the shower and the switching valve spool mentioned above; said main body of the shower comprises an outlet cover and a handle, said sealing switching valve spool is in the handle.

In a preferred embodiment: said operating unit is a button that exposed on the outside of said main body of the shower, a fixed base is arranged in said main body;

one end of said button is connected with the fixed base rotatingly, and the other end is a pressing end;

said fixed base is also connected to a swinging block rotatingly, when said pressing end of the button is pressed down, the swinging block swings by the extrusion of the button, said swinging block is linked with the transmission block in the course of swinging, and said transmission block converts the swing of the swinging block to an axial movement; said transmission block converts the switching shaft from swing to a movement along the axial direction; said transmission block moves along the axial direction driving the switching shaft to move.

In a preferred embodiment: a reset unit is arranged at the peripheral covering of said switching shaft, one end of the reset unit abuts against the switching shaft and other end abuts against the fixed shaft; when said switching shaft moves from the third position to the first position, the reset unit is compressed to accumulate the elastic restoring force.

The advantages of the present invention over the known prior arts are:

1. The present invention discloses a switching valve spool, through the switching shaft moving along the axis, during the moving, the switching shaft closes the inlet to get to the state of waterstop, or the air intake is closed and the inlet is opened to get to the state of non-aerated spray, or the air intake and the inlet is opened respectively to get to the state of aerated spray. Therefore, the three modes of waterstop, common water and functional water can be switched. The process of switching is an one-way cycle and the operation is relatively simple.

2. The present invention discloses a switching valve spool, when the water flows into the first cavity of the fixed shaft from the outlet of the switching shaft, the air is sucked from the air intake into the first cavity and mixes with the water, due to the sudden change of the flow area creating the Venturi effect, to form the aerated spray. The structure of the aerated spray formed in this way is simple and reliable.

3. The present invention discloses a switching valve spool, when the switching shaft is at the first position, a first sealing gasket has water at both ends along the axis, so the first sealing gasket is at the state of water pressure balance, the switching shaft does not need to overcome the resistance of the flow during the moving, the force for switching is relatively light and it feels better in the hand.

PREFERRED EMBODIMENT OF THE INVENTION

With the following description of the drawings and specific embodiments, the invention shall be easier to understand.

Referring to FIG. 1 to FIG. 5, a shower, comprising: a main body 1 of the shower and a switching valve spool 2; and said main body 1 comprising an outlet cover 11 and a handle 12, the switching valve spool 2 is disposed in the handle 12.

Figure 3:
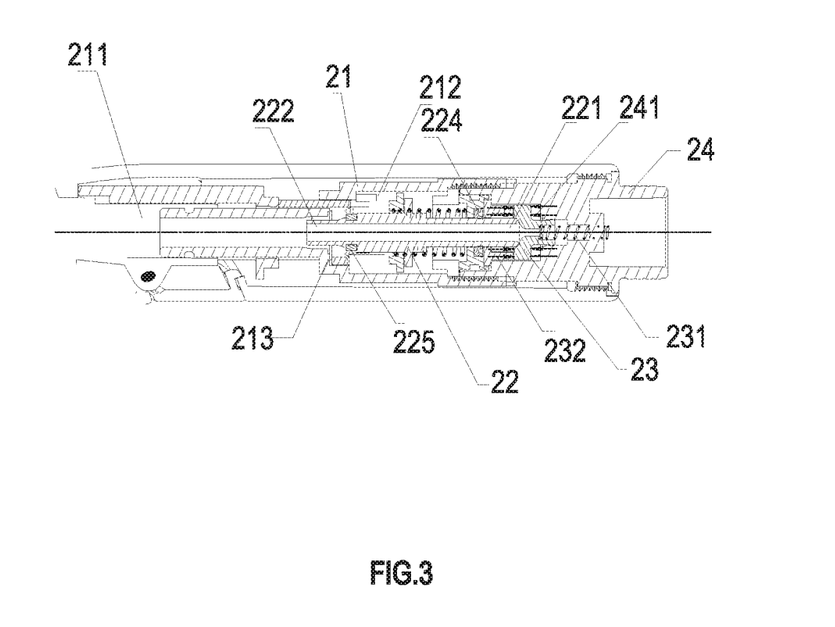
FIG. 3 shows the schematic view of the water flow when the switching shaft is in the first position.
Figure 4:
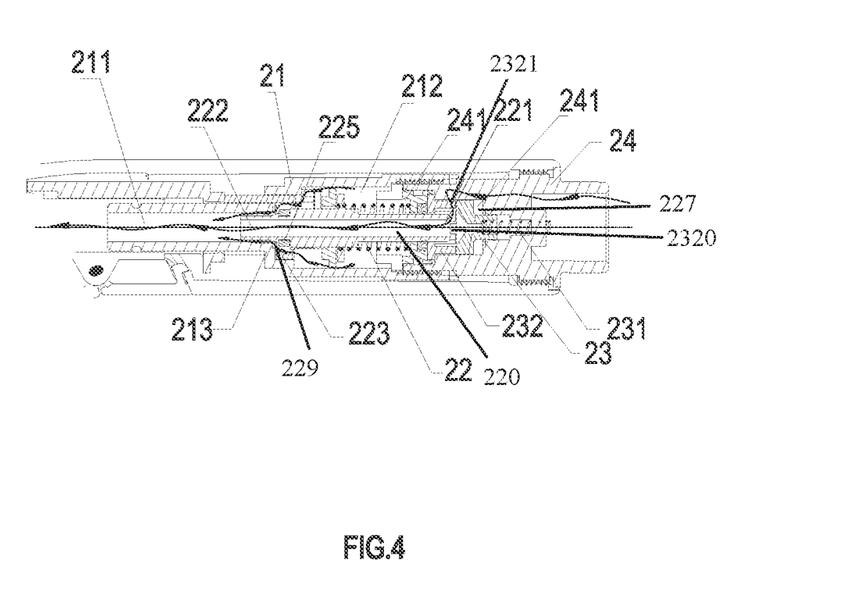
FIG. 4 shows the schematic view of the water flow when the switching shaft is in the second position.
Figure 5:
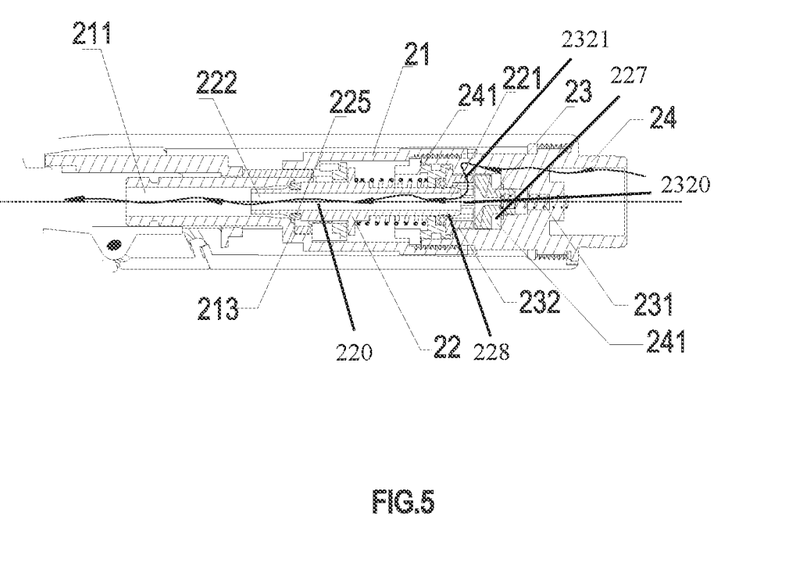
FIG. 5 shows the schematic view of the water flow when the switching shaft is in the third position.

Said switching valve spool 2, comprising: a fixed shaft 21 and a switching shaft 22 which is coaxially linked with the fixed shaft 21 arranged in the fixed shaft 21; said switching shaft 22 moves between the first position, the second position, and the third position along the axial direction within the fixed shaft 21 due to the linkage of said switching shaft 22 and an operating unit 3;

One end of said switching shaft 22 is an inlet 221, other end is an outlet 222, and an axial flow passage 220 is formed along the axis. When said switching shaft 22 is at in the first position, the inlet 221 is closed to form a state of waterstop. When said switching shaft 22 is at the second position, said inlet 221 is opened and an air intake 223 is formed between the side wall of the switching shaft 22 closest to the outlet 222 and the fixed shaft 21. When the water flows into the fixed shaft 21 from the outlet 222, the air, due to the diameter of the fixed shaft 21 being larger than the diameter of said outlet 222, is sucked from said air intake 223 under the Venturi effect and mixes with the water in the fixed shaft 21 to form an aerated spray. When said switching shaft 22 is at the third position, said inlet 221 remains open and said air intake 223 is closed to achieve a non-aerated spray.

To sum up, said structure is to offer that, during the switching shaft moves in a-single direction, the inlet 221 is closed to achieve a state of waterstop, or the air intake 223 is closed and the inlet 221 is opened to achieve a state of a non-aerated spray, or the air intake 223 and the inlet 221 is opened simultaneously to achieve a state of an aerated spray. Therefore, it is more convenient to achieve the switching of three modes of waterstop, common water and functional water by the single-direction movement of the switching shaft 22.

In order to achieve that the inlet 221 is closed while the switching shaft 22 is at the first position, the preferred embodiment adores the structure below:

The structure also comprises a first sealing unit 23 arranged coaxially with said switching shaft 22, said first sealing unit 23 is at the rear of the inlet 221 along the axial direction, when said switching shaft 22 is at the first position, the end face of said inlet abuts against said first sealing unit 23 to close said inlet 221.

Specifically, said first sealing unit 23's placement is: the side of said fixed shaft 21 which is close to one side of said inlet 221 connects to an inlet joint 24; a containing cavity 241 is arranged at the side of said inlet joint 24 closing to the inlet 221; said first sealing unit 23 is arranged in said containing cavity 241; the water flows from the inlet joint 24 to said containing cavity 241 and it could only go through said flow passage into said fixed shaft 21.

In order to ensure the stability of the seal, the first sealing unit must maintain the condition of fitting into the end face of the inlet when the first sealing unit 23 abuts the inlet 221 sealingly, otherwise the seal would be unreliable because the first sealing unit is pressed by the inlet 221 and then moves backward. In order to solve this problem, the two sides of said first sealing unit 23 are arranged against one elastic unit 231 and a support unit 232 respectively along the axis; when said fixed shaft 21 is at the first position, said elastic unit 231 produces holding power to the first sealing unit 23 to make it maintain the condition of fitting into said inlet 221; when said switching shaft 22 is at other positions, said elastic unit 231 drives the first sealing unit 23 to reset to the initial position where the first sealing unit 23 abuts against the support unit 232. Due to the elastic reset force provided by the elastic unit 231, when the end face of the inlet 221 abuts against the first sealing unit 23, the elastic unit 231 provides elastic reset force which is in opposite direction to the pressure resistance of the first sealing unit 23, to make sure that the first sealing unit 23 would not move backward along the axial direction, so that the first sealing unit 23 maintains the condition of fitting into the end face of the inlet 221.

Based on above-mentioned structure, said support unit 232 has a hole 2320 arranged along the axis to let the inlet 221 of said switching shaft 22 pass through the hole 2320 to enter said containing cavity 241; so that the support unit 232 would not impede the movement of the switching shaft 22.

In addition, in order to drive the water coming from the inlet joint 24 to get into the containing cavity 241 where the inlet 221 is located, the periphery of the support unit 232 also has a water inlet 2321 perpendicular to the axial direction, the water coming from the inlet joint 24 flows through the water inlet 2321 and then enters said containing cavity 241.

Moreover, in order to ensure the reliability of the water-stop, as mentioned above, the water from the inlet joint 24 to said containing cavity 241 could only pass through said flow passage 220 into said fixed shaft 21. So that there would not be water getting into the fixed shaft 21 after the inlet 221 is closed. But based on the above-mentioned structure, the water would pass the water inlet 2321 of the support unit 232, which has the hole 2320, and inevitably flow out of the hole 2320.

In order to solve this problem, a second sealing unit 224, arranged on the side of the outer wall of said switching shaft 22 closest to the inlet 221, seals the gap 228 between the switching shaft 22 and the hole 2320, so that the water in said containing cavity 241 can only pass through said flow passage 220 into said fixed shaft 21.

Moreover, there is a proper gap 227 between the side of said first sealing unit 23 which is away from said inlet 221 and the back end of said containing cavity 241; when said switching shaft 22 is at the first position, the flow comes from the water inlet 2321 of the support unit 232 to the containing cavity 241, so that both the front surface and the back surface of said first sealing unit 23 are subjected to the pressure of the flow in the axial direction, the pressure is equal in magnitude and opposite in direction, and it forms a balance of the water pressure. So that the switching shaft 22 does not need to overcome the resistance of the flow during its movement, the force for switching is lighter and it feels better in the hand.

In order to achieve the aerated spray, in the present embodiment, said fixed shaft 21 has a first cavity 211 and a second cavity 212, which are mutually connected each other along the axial direction, the diameter of said first cavity 211 is smaller than said second cavity 212 so as to form a step surface 213 in the connection between the first cavity 211 and the second cavity 212; the water flows into said first cavity 211 from the outlet of the switching shaft 22; in order to achieve the Venturi effect, the diameter of the first cavity 211 is larger than the diameter of the outlet 222 so that a sudden change of the flow area creates the Venturi effect when the water comes to the first cavity 211 from the outlet 222.

A third sealing unit 225 is arranged on side of said switching shaft 22 closest to said outlet 222. Said third sealing unit 225 moves toward the direction of the step surface 213 during the movement of said switching shaft 22 from the first position to the third position. When said switching shaft 22 is at the second position, said third sealing unit 225 does not contact with the step surface 213 so that the gap 229 between the outer wall of said switching shaft 22 and the step surface 213 forms said air intake 223. When said switching shaft 22 is at the third position, said third sealing unit 225 abuts against the step surface 213 so that said air intake 223 is closed. Thus, the switch of the aerated spray and the non-aerated spray can be achieved.

Figure 1:
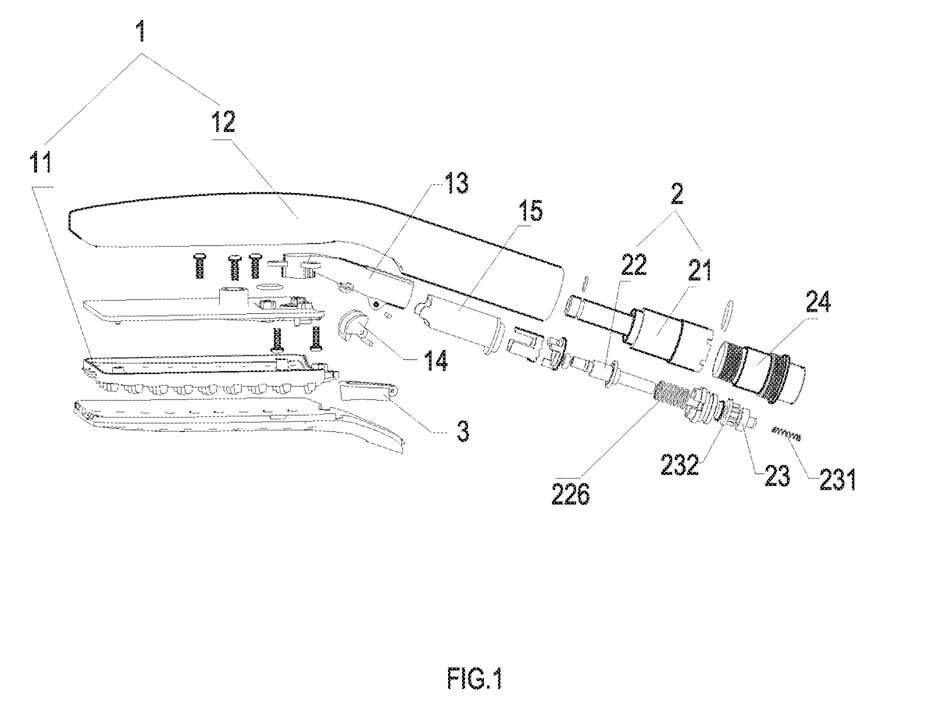
FIG. 1 shows the exploded view of the shower of one preferred embodiment of the present invention.
Figure 2:
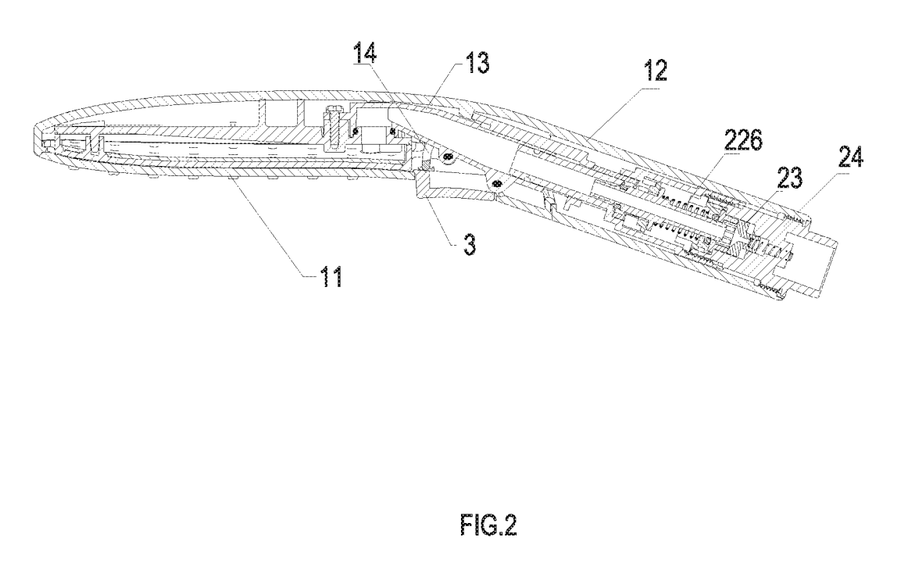
FIG. 2 shows a section view of the shower of one preferred embodiment of the present invention.

Furthermore, said operating unit 3 is a button that exposed on the outside of said main body 1, a fixed base 13 is arranged in said main body 1; one end of said button is connected with the fixed base 13 rotatingly, and the other end is a pressing end;

A swinging block 14 is rotatingly connected to the fixed base 13. When the pressing end of the button 3 is pressed down, the swinging block 14 is swung by the extrusion of the button 3, said swinging block 14 connects with a transmission block 15, and the swing of the swinging block 14 drives the transmission block 15 to move in the axial direction; said transmission block 15 moves along the axial direction, driving the switching shaft 22 to move. So that the button 3 drives the switching shaft 22 to move backward along the axial direction, that is moving from the third position to the first position.

To achieve the forward movement of the switching shaft 22 along the axial direction, a reset unit 226 is arranged at the peripheral covering of said switching shaft 22, one of the end of the reset unit 226 abuts against the switching shaft 22 and other end abuts against the support unit 232; when said switching shaft 22 moves from the third position to the first position, the reset unit 226 is compressed to accumulate the elastic restoring force. When the transmission block 15 and the switching shaft 22 do not abut against each other, the switching shaft 22 moves from the first position to the third position under the elastic restoring force.

The invention has been described with reference to the preferred embodiments mentioned above; therefore it cannot limit the reference implementation of the invention. It is obvious to a person skilled in the art that structural modification and changes can be carried out without leaving the scope of the claims hereinafter and the description above. Therefore, the scope of protection of the rights is based on the scope of the claims.

What is claimed is:

1. A switching valve spool, comprising:
    a fixed shaft, and
    a switching shaft coaxially disposed in the fixed shaft, wherein:
        the switching shaft moves between a first position, a second position, and a third position in the fixed shaft along an axial direction of the fixed shaft,
        a first end of the switching shaft defines an inlet and a second end defines an outlet,
        flow passage is disposed along an axial direction of the switching shaft between the inlet and the outlet,
        an air intake is disposed between a side wall of the switching shaft adjacent to the outlet and the fixed shaft,
        when the switching shaft is at the first position:
            the inlet is closed to define a water stoppage state, and
        when the switching shaft is at the second said one position:
            the inlet is open,
            the air intake is open,
            water flows into the fixed shaft from the outlet, and
            due to a diameter of the fixed shaft being larger than a diameter of the outlet, air is sucked from the air intake due to a Venturi effect into the fixed shaft and mixes with the water to form aerated water, and
        when the switching shaft is at the third position:
            the inlet remains open and the air intake is closed to form non-aerated water.

2. The switching valve spool according to claim 1, comprising:
    a first sealing ring, wherein:
        the first sealing ring is coaxial with the switching shaft,
        the first sealing ring is disposed adjacent to the inlet along the axial direction of the switching shaft, and when the switching shaft is at the first position:
an end face of the inlet fits into the first sealing ring to close the inlet.
3. The switching valve spool according to claim 2, wherein:
a first side of the fixed shaft adjacent to the inlet connects to an inlet joint,
a containing cavity is disposed at a first side of the inlet joint adjacent to the inlet,
the first sealing ring is disposed in the containing cavity, and
the water coming from the inlet joint flows into the containing cavity and is configured to only flow through the flow passage into the fixed shaft.
4. The switching valve spool according to claim 3, wherein:
two ends of the first sealing ring respectively abut a first elastic unit and a support unit along the axial direction of the switching shaft,
when the switching shaft is at the first position:
the first elastic unit applies a support force to the first sealing ring causing the end face of the inlet to fit into the first sealing ring, and
when the switching shaft is at the second position or the third position:
the first elastic unit drives the first sealing ring to reset to an initial position where the first sealing ring abuts the support unit.
5. The switching valve spool according to claim 4, wherein:
the support unit defines a hole arranged along the axial direction of the switching shaft to enable the inlet of the switching shaft to enter the containing cavity,
an outer circumference of the support unit defines an inlet hole perpendicular to the axial direction of the switching shaft, and
the water flows into the containing cavity through the inlet hole after flowing out from the inlet joint.
6. The switching valve spool according to claim 5, wherein:
a preset gap between a first side of the first sealing ring facing away from the inlet and a back end of the containing cavity, and
when the switching shaft is at the first position:
the water flows out from the inlet hole of the support unit and into the containing cavity,
a front side and a rear side of the first sealing ring in the axial direction of the switching shaft are respectively subjected to a first force and a second force by the water,
a magnitude of the first force is equal to a magnitude of the second force, and
a direction of the first force is opposite to a direction of the second force.
7. The switching valve spool according to claim 5, wherein:
a second sealing ring is disposed on a first side of an outer wall of the switching shaft adjacent to the inlet, and
the second sealing ring seals a first gap between the switching shaft and the hole.
8. The switching valve spool according to claim 1, wherein:
a third sealing ring is disposed on a second side of an outer wall of the switching shaft adjacent to the outlet,
the fixed shaft defines a first cavity and a second cavity,
the first cavity is connected to the second cavity along the axial direction of the switching shaft,
a diameter of the first cavity is less than a diameter of the second cavity to define a step surface disposed at a connection position between the first cavity and the second cavity,
the water flows into the first cavity from the outlet of the switching shaft,
when the switching shaft moves from the first to the third position:
the third sealing ring moves toward the step surface,
when the switching shaft is at the second position:
the third sealing ring does not contact the step surface, and
a second gap between the outer wall of the switching shaft and the step surface defines the air intake, and
when the switching shaft is at the third position:
the third sealing ring abuts the step surface causing the air intake to be closed.
9. A shower, comprising:
a main body of the shower, and
a switching valve spool comprising:
a fixed shaft, and
a switching shaft coaxially disposed in the fixed shaft, wherein:
an operating unit is linked to the switching shaft and drives the switching shaft to move between a first position and a second position in the fixed shaft along an axial direction of the fixed shaft,
the operating unit comprises a button,
a first end of the switching shaft defines an inlet and a second end defines an outlet,
a flow passage is disposed along an axial direction of the switching shaft between the inlet and the outlet,
an air intake is disposed between a side wall of the switching shaft adjacent to the outlet and the fixed shaft,
when the switching shaft is at the first position:
the inlet is open,
the air intake is open,
water flows into the fixed shaft from the outlet, and
due to a diameter of the fixed shaft being larger than a diameter of the outlet, air is sucked from the air intake due to a Venturi effect into the fixed shaft and mixes with the water to form aerated water,
when the switching shaft is at the second position:
the inlet remains open and the air intake is closed to form non-aerated water,
the main body of the shower comprises an outlet cover and a handle,
the switching valve spool is disposed in the handle,
a fixed base is disposed in the main body,
a first end of the button is rotatably connected to the fixed base,
a second end of the button is a pressing end,
the fixed base is rotatably connected to a swinging block,
when the pressing end of the button is pressed down:
the swinging block swings due to a force subjected from the button,
the swinging block is linked to a transmission block during swinging of the swinging block,
the transmission block converts the swinging of the swinging block to movement of the switching shaft in the axial direction of the switching shaft, and the transmission block drives the switching shaft when the transmission block moves along the axial direction of the switching shaft.

10. The shower according to claim 9, comprising:
an elastic unit disposed on an outer circumference of the switching shaft, wherein:
   a first end of the elastic unit abuts the switching shaft and a second end abuts the fixed shaft, and
   when the switching shaft moves from the second position to a third position in which the inlet is closed:
      the second elastic unit is compressed to accumulate an elastic restoring force.

11. A shower, comprising:
a main body of the shower, and
a switching valve spool comprising:
   a fixed shaft, and
   a switching shaft coaxially disposed in the fixed shaft, wherein:
      the switching shaft moves between a first position and a second position in the fixed shaft along an axial direction of the fixed shaft,
      a first end of the switching shaft defines an inlet and a second end defines an outlet,
      a flow passage is disposed along an axial direction of the switching shaft between the inlet and the outlet,
      an air intake is disposed between a side wall of the switching shaft adjacent to the outlet and the fixed shaft,
      when the switching shaft is at the first position:
         the inlet is open,
         the air intake is open,
         water flows into the fixed shaft from the outlet, and
         due to a diameter of the fixed shaft being larger than a diameter of the outlet, air is sucked from the air intake due to a Venturi effect into the fixed shaft and mixes with the water to form aerated water,
      when the switching shaft is at the second position:
         the inlet remains open and the air intake is closed to form non-aerated water,
      the main body of the shower comprises an outlet cover and a handle,
      the switching valve spool is disposed in the handle,
      an elastic unit is disposed on an outer circumference of the switching shaft,
      a first end of the elastic unit abuts the switching shaft and a second end abuts the fixed shaft, and
      when the switching shaft moves from the second position to a third position in which the inlet is closed:
         the elastic unit is compressed to accumulate an elastic restoring force.

* * * * *